(12) United States Patent
Chen et al.

(10) Patent No.: US 11,093,790 B2
(45) Date of Patent: Aug. 17, 2021

(54) DISTANCE STATISTICS BASED METHOD FOR 3D SONAR POINT CLOUD IMAGE ENHANCEMENT

(71) Applicant: ZHEJIANG UNIVERSITY, Hangzhou (CN)

(72) Inventors: Yaowu Chen, Hangzhou (CN); Xiang Tian, Hangzhou (CN); Rongxin Jiang, Hangzhou (CN); Xuesong Liu, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 541 days.

(21) Appl. No.: 16/079,543

(22) PCT Filed: Dec. 8, 2017

(86) PCT No.: PCT/CN2017/115158
§ 371 (c)(1),
(2) Date: Aug. 23, 2018

(87) PCT Pub. No.: WO2018/161662
PCT Pub. Date: Sep. 13, 2018

(65) Prior Publication Data
US 2021/0192268 A1 Jun. 24, 2021

(30) Foreign Application Priority Data
Mar. 8, 2017 (CN) .......................... 201710135604.0

(51) Int. Cl.
*G06K 9/40* (2006.01)
*G06K 9/62* (2006.01)
*G06T 5/00* (2006.01)

(52) U.S. Cl.
CPC .............. *G06K 9/6215* (2013.01); *G06T 5/00* (2013.01); *G06T 2207/10028* (2013.01); *G06T 2207/20076* (2013.01)

(58) Field of Classification Search
CPC .................... G06K 9/6215; G06T 5/00; G06T 2207/10028; G06T 2207/20076
See application file for complete search history.

(56) References Cited

U.S. PATENT DOCUMENTS 8,274,508 B2 * 9/2012 Porikli ................. G06K 9/6214
345/419
8,335,346 B2 * 12/2012 Saisan .................. G06K 9/6247
382/103

(Continued)

FOREIGN PATENT DOCUMENTS

| CN | 102629367 | | 8/2012 |
| CN | 102629367 A | * | 8/2012 |

(Continued)

OTHER PUBLICATIONS

Fast Construction of κ-Nearest Neighbor Graphs for Point Clouds, Michael Connor et al., IEEE, 1077-2626, 2010, pp. 599-608 (Year: 2010).*

(Continued)

*Primary Examiner* — Jayesh A Patel
(74) *Attorney, Agent, or Firm* — Jiwen Chen; Jacobson Holman PLLC

(57) ABSTRACT

The present invention discloses a distance statistics based method for 3D sonar point cloud image enhancement, comprising the following steps: (1) obtaining sonar data, and converting 3D sonar range image information corresponding to sonar data per frame into point cloud data in global coordinate; (2) using a kd-tree to search the point cloud data, and calculate Euclidean distance $L_{ij}$ between point $P_i$ and the nearest K point cloud data; wherein, value range of i and j (Continued)

is $1 \leq i \leq N$ and $1 \leq j \leq K$ respectively; N refers to the total quantity of point cloud data; (3) excluding point cloud data corresponding to mean value of $L_{ij}$ which do not match the certain Gaussian distribution, and complete enhancement of 3D sonar point cloud image. Such method features in easy operation, high efficiency and convenience, which can effectively remove outlier points to minimize noise, and enhance point cloud image.

6 Claims, 3 Drawing Sheets

(56) References Cited

U.S. PATENT DOCUMENTS

| | | | | |
|---|---|---|---|---|
| 8,705,870 | B2* | 4/2014 | Wang | G06F 16/583 |
| | | | | 382/201 |
| 8,768,659 | B2* | 7/2014 | Vasudevan | G06N 20/10 |
| | | | | 703/2 |
| 9,196,021 | B2* | 11/2015 | Jin | G06T 5/002 |
| 10,430,551 | B2* | 10/2019 | Wang | G06F 16/56 |
| 10,467,756 | B2* | 11/2019 | Karlinsky | G06K 9/6203 |
| 10,846,562 | B2* | 11/2020 | Bazzi | G06K 9/6224 |
| 2011/0075927 | A1* | 3/2011 | Xu | G06T 7/187 |
| | | | | 382/173 |
| 2012/0139325 | A1* | 6/2012 | Norberg | G06N 20/10 |
| | | | | 299/10 |
| 2013/0079287 | A1* | 3/2013 | Jung | A61P 17/04 |
| | | | | 514/18.7 |
| 2014/0233862 | A1* | 8/2014 | Pack | G06T 5/40 |
| | | | | 382/274 |

FOREIGN PATENT DOCUMENTS

| | | | |
|---|---|---|---|
| CN | 102944174 | | 2/2013 |
| CN | 103197308 A | * | 7/2013 |
| CN | 103824270 | | 5/2014 |
| CN | 104463826 | | 3/2015 |
| CN | 105096268 | | 11/2015 |
| CN | 105785349 | | 7/2016 |

OTHER PUBLICATIONS

Segmentation of point clouds using smoothness constraint, George Vosselman et al., ResearchGate, Jan. 2006, pp. 248-253 (Year: 2006).*

A fast all nearest neighbor algorithm for applications involving large point-clouds, Jagan Sankaranarayanan et al., Elsevier, 0097-8493, 2006, pp. 157-174 (Year: 2006).*

* cited by examiner

DISTANCE STATISTICS BASED METHOD FOR 3D SONAR POINT CLOUD IMAGE ENHANCEMENT

This is a U.S. national stage application of PCT Application No. PCT/CN2017/115158 under 35 U.S.C. 371, filed Dec. 8, 2017 in Chinese, claiming priority of Chinese Application No. 201710135604.0, filed Mar. 8, 2017, all of which are hereby incorporated by reference.

FIELD OF THE INVENTION

The present invention belongs to the field of three-dimensional (3D) sonar point cloud image processing, which is in particular related to a distance statistics based method for 3D sonar point cloud image enhancement.

BACKGROUND ARTS

The phase-calculated array 3D sonar system is a new type of submarine 3D acoustic imaging system, which has high application value in such fields as real-time monitoring of port and protection of frogmen (diver) engaged in underwater operations.

However, due to influence from such factors as equipment precision, experiences of operators, underwater environment, changes to surface properties of objects tested as well as data integration and registration, it is inevitable that some noise points may occur to 3D sonar point cloud data as obtained. In addition to noise points produced by such measurement deviations, there might be some discrete points—outliers farther away from principal point clouds, namely point clouds of objects tested in point cloud data during practical application due to influence from such factors as external interferences and barrier. As the first step of pre-processing, filtering during point cloud processing normally has high impact on follow-up processing pipeline. The only way for better follow-up processing, such as registration, feature extraction, curved planar reformation and visualization, is to customize noise points and outliers in reference to follow-up processing during filtering.

In view of aforesaid conditions, it is urgent to propose a reliable and efficient method for 3D sonar point cloud image enhancement with high engineering value.

SUMMARY OF THE INVENTION

In view of foregoing factors, the present invention provides a distance statistics based method for 3D sonar point cloud image enhancement; such method features in easy operation, high efficiency and convenience, which can effectively remove outliers to minimize noise, and enhance point cloud image.

On one hand, the present invention proposes a distance statistics based method for 3D sonar point cloud image enhancement, comprising the following steps:

(1) obtaining sonar data, and converting 3D sonar range image information corresponding to sonar data per frame into point cloud data in global coordinate;

(2) using a kd-tree to search the point cloud data, and calculating Euclidean distance $L_{ij}$ between each point cloud data $P_i$ and the nearest K point cloud data; wherein, value range of i and j is $1 \leq i \leq N$ and $1 \leq j \leq K$ (respectively; N refers to the total quantity of point cloud data;

(3) excluding point cloud data corresponding to mean value of $L_{ij}$ which do not match the certain Gaussian distribution, and complete enhancement of 3D sonar point cloud image.

Specific procedures of the Step (2) are stated as follows:

(2-1) establishing a kd-tree for N points cloud data, and using the such kd-tree to search each point $P_i$ in the cloud data;

(2-2) For each point $P_i$, using K-NN to search its K nearest point cloud data, and calculating the Euclidean distance $L_{ij}$ between point cloud data $P_i$ and the nearest point cloud data.

Specific procedures of the Step (3) are stated as follows:

(3-1) calculating mean value $L_i$ of K Euclidean distance $L_{ij}$ for point $P_i$;

(3-2) calculating mean value $\mu$ and standard deviation $\sigma$ for N elements in $L_i$;

(3-3) estimating mean value of $\mu$ and standard deviation of $\sigma$ for all $L_i$; selecting point cloud data whose value of corresponding $L_i$ element is outside of a--b as outlier; removing the outlier to complete enhancement of 3D sonar point cloud image; wherein, $a=\mu-\alpha\times\sigma$ and $b=\mu+\alpha\times\sigma$; $\alpha$ is a real number, referring as expansion coefficient.

On the other hand, the present invention proposes a distance statistics based method for 3D sonar point cloud image enhancement, comprising the following steps:

(1') obtaining sonar data, and convert 3D sonar range image information corresponding to sonar data per frame into point cloud data in global coordinate;

(2') using a kd-tree to search the point cloud data, and calculating Euclidean distance $L_{ij}$ between point $P_i$ and all other point cloud data within its neighborhood in distance r; wherein, value range of i and j is $1 \leq i \leq N$ and $1 \leq j \leq M_i$ respectively; N refers to the total quantity of point cloud data; $M_i$ refers to the quantity of point cloud data within neighborhood in distance r of point cloud data $P_i$;

(3') excluding point cloud data corresponding to mean value of $L_{ij}$ which do not match the certain Gaussian distribution, and complete enhancement of 3D sonar point cloud image.

Specific procedures of the Step (2') are stated as follows:

(2-1') establishing a kd-tree for N point cloud data, and use the kd-tree to search each point $P_i$ in the cloud data;

(2-2') For each point $P_i$, searching all point cloud data within neighborhood in distance r, and calculating the Euclidean distance $L_{ij}$ between point cloud data $P_i$ and all point cloud data within its neighborhood in distance r.

Specific procedures for the Step (3') are stated as follows:

(3-1') calculating mean value $L_i'$ of $M_i$ Euclidean distance $L_{ij}$ for point cloud data $P_i$;

(3-2') calculating mean value $\mu'$ and standard deviation $\sigma'$ for N elements in $L_i$;

(3-3') for all $L_i'$, calculating means value of $\mu'$ and standard deviation of $\sigma'$ for Gaussian distribution statistics; selecting point cloud data whose value of corresponding $L_i$ element is outside of a'--b' as outlier; remove the outlier to complete enhancement of 3D sonar point cloud image; wherein, $a'=\mu'-\alpha\times\sigma'$ and $b'=\mu'+\alpha\times\sigma'$; $\alpha$ is a real number, referring as expansion coefficient.

As compared with prior arts, the present invention is provided with the following beneficial technical results:

(1) It is applicable to make use of this method for selective removal of most of outliers prior to processing of a mass of point cloud data as collected; this can alleviate influence from system bias and ambient noise, reduce work load for follow-up processing, and improve data efficiency, which is favorable for post processing, such as image reconstruction and image enhancement.

(2) The present invention is available for handy setting of parameters to remove outliers at different degrees according to individual difference between systems and environments.

It requires no program for re-modification of system, which is convenient and quick owing to its high practicability and flexibility.

(3) The enhancement method according to present invention has high efficiency, which can apply 3D sonar point cloud image enhancement through special algorithm. It features in short program running time and quick data processing, which can satisfy requirement for real-time performance.

SPECIFIC EMBODIMENTS OF THE INVENTION

To ensure comprehensive description of the present invention, technical solutions of the present invention are described in details as follows in combination with drawings and preferred embodiments.

Figure 1:
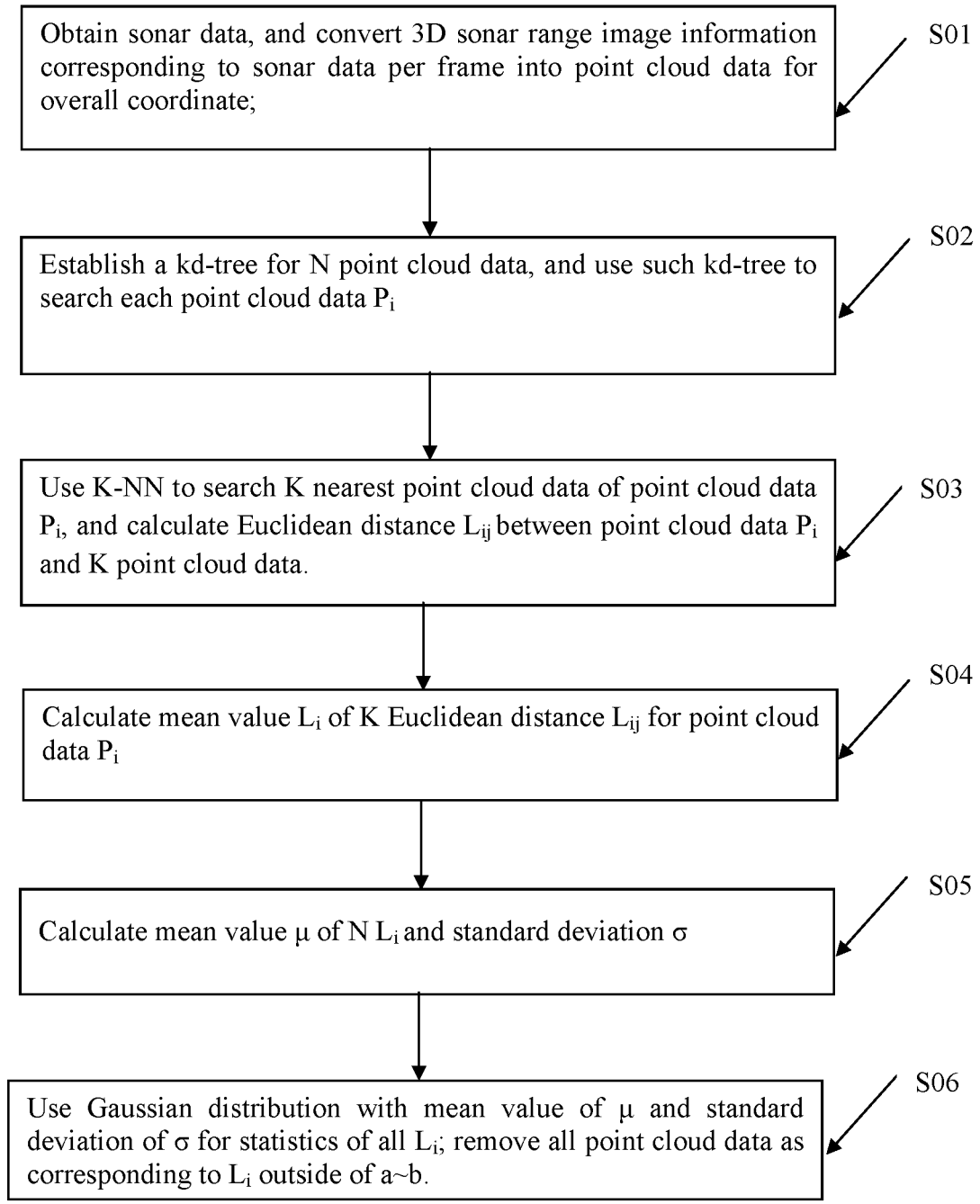
FIG. 1 is the flow chart for the distance statistics based method for 3D sonar point cloud image enhancement according to Embodiment 1.

FIG. 1 shows is a distance statistics based method for 3D sonar point cloud image enhancement proposed in Embodiment 1, comprising the following steps:

S01, obtaining sonar data, and converting 3D sonar range image information corresponding to sonar data per frame into point cloud data in global coordinate;

S02, establishing a kd-tree for N point cloud data, and use the kd-tree to search each point $P_i$ in point cloud data; wherein, value range of i is $1 \leq i \leq$.

S03, for point $P_i$, using K-NN to search its K nearest point cloud data of point cloud data $P_i$, and calculating the Euclidean distance $L_{ij}$ between point $P_i$ and the K nearest point cloud data; wherein, value range of j is $1 \leq j \leq K$.

S04, calculating mean value $L_i$ of K Euclidean distance $L_{ij}$ for point $P_i$;

S05, calculating mean value $\mu$ and standard deviation $\sigma$ for N elements in $L_i$;

S06, Estimating mean value of $\mu$ and standard deviation of $\sigma$ for all $L_i$; selecting point cloud data whose value of corresponding $L_i$ element is outside of a--b as outlier; remove the outlier to complete enhancement of 3D sonar point cloud image; wherein, $a=\mu-\alpha\times\sigma$ and $b=\mu+\alpha\times\sigma$; $\alpha$ is a real number, referring as expansion coefficient.

Figure 2:
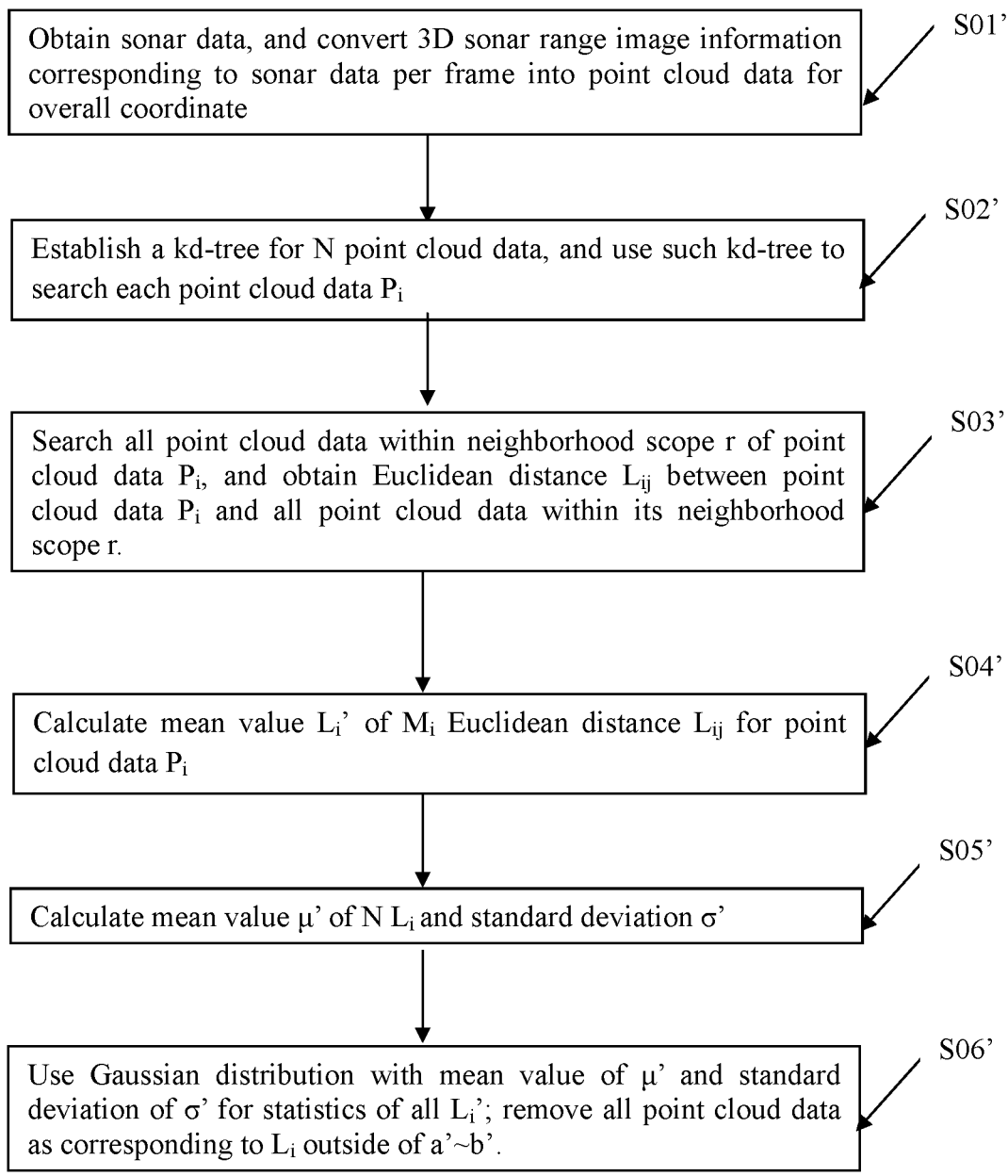
FIG. 2 is the flow chart for the distance statistics based method for 3D sonar point cloud image enhancement according to Embodiment 2.
Figure 3:
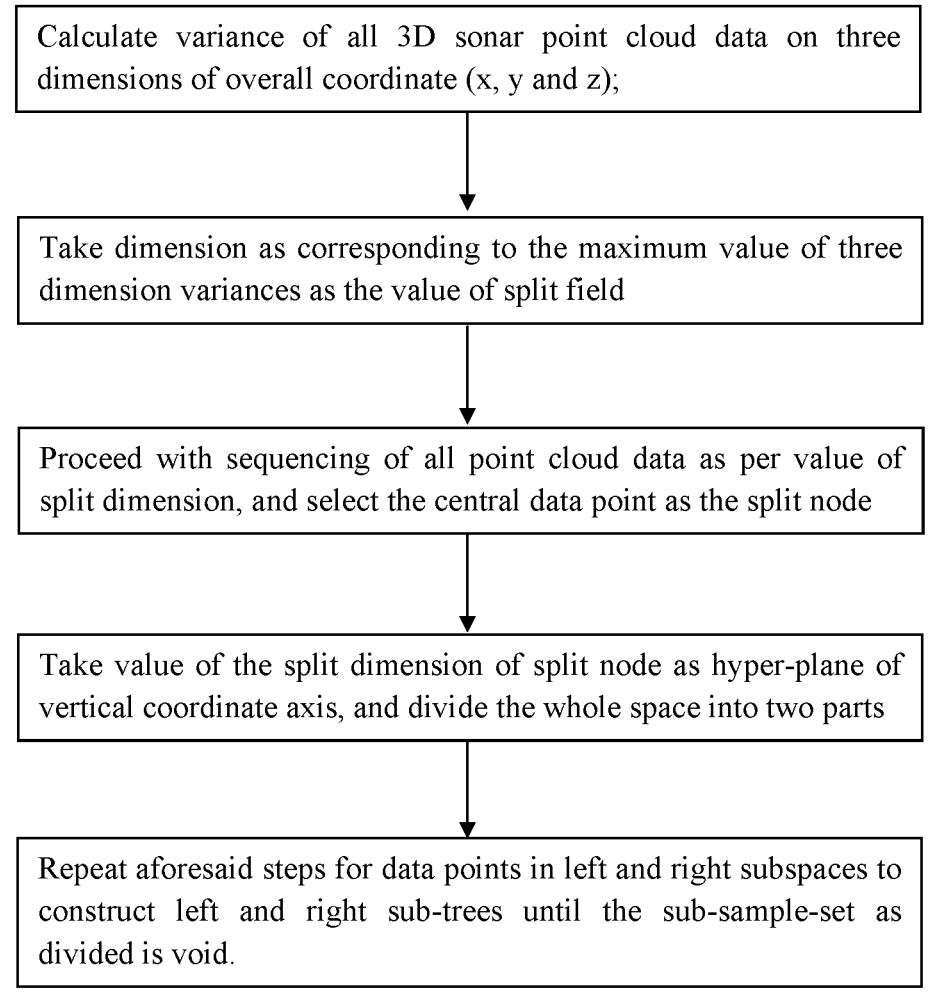
FIG. 3 is the flow chart for establishment of kd-tree for 3 D sonar point cloud data.

FIG. 2 shows a distance statistics based method for 3D sonar point cloud image enhancement proposed in Embodiment 2, comprising the following steps:

S01', obtaining sonar data, and converting 3D sonar range image information corresponding to sonar data per frame into point cloud data in global coordinate;

S02', establishing a kd-tree for N point cloud data, and using the kd-tree to search each each point $P_i$ in point cloud data; value range of i is $1 \leq i \leq N$.

S03', for point $P_i$, searching all point cloud data within neighborhood in distance r, and calculating the Euclidean distance $L_{ij}$ between point cloud data $P_i$ and all point cloud data within its neighborhood in distance r through calculation; value range of j is $1 \leq j \leq M_i$; $M_i$ refers to the quantity of point cloud data within neighborhood in distance r of point cloud data $P_i$.

S04', calculating mean value $L_i'$ of $M_i$ Euclidean distance $L_{ij}$ for point $P_i$;

S05', calculating mean value $\mu'$ and standard deviation $\sigma'$ for N elements in $L_i$;

S06', for all $L_i'$, calculating mean value of $\mu'$ and standard deviation of $\sigma'$ for Gaussian distribution statistics; selecting point cloud data whose value of corresponding $L_i$ element is outside of a'--b' as outlier; removing the outlier to complete enhancement of 3D sonar point cloud image; wherein, $a'=\mu'-\alpha\times\sigma'$ and $b'=\mu'+\alpha\times\sigma'$; $\alpha$ is a real number, referring as expansion coefficient.

The process for establishment of aforesaid kd-tree is stated as follows:

(1) calculating variance of all 3D sonar point cloud data on three dimensions of overall coordinate (x, y and z);

(2) taking dimension as corresponding to the maximum value of three dimension variances as the value of split field;

(3) ordering all point cloud data by its value of split dimension, and select the central data point as the split node;

(4) taking value of the split dimension of split node as hyper-plane of vertical coordinate axis, and dividing the whole space into two parts;

(5) repeating aforesaid steps for data points in left and right subspaces to construct left and right sub-trees until the sub-sample-set divided is void.

Making use of the first method to remove noise of point cloud data, and proceeding with setting of $\alpha=1$ and $K=30$. As indicated by data subjecting to numerous practical tests, when aforesaid parameters are used, around 1% points are removed in view of noise.

technical solutions and beneficial results of the present invention are detailed described by the detail method described above. It should be understood that what described above are only optimal embodiments of the present invention, which are not intended to restrict the present invention. Any modification, supplement and equivalent substitution which made according to principles of the present invention will fall into the protection scope of the present invention.

The invention claimed is:

1. A distance statistics based method for 3D sonar point cloud image enhancement, comprising the following steps:
   (1) obtaining sonar data, and converting 3D sonar range image information corresponding to sonar data per frame into point cloud data in global coordinate;
   (2) using a kd-tree to search the point cloud data, and calculating Euclidean distance Lij between point Pi and nearest K point cloud data; wherein, value range of i and j is $1 \leq i \leq N$ and $1 \leq j \leq K$ respectively; N refers to total quantity of the point cloud data;
   (3) excluding point cloud data corresponding to mean value of Lij which do not match certain Gaussian distribution, and complete enhancement of 3D sonar point cloud image.

2. The distance statistics based method for 3D sonar point cloud image enhancement according to claim 1, characterized in that specific procedures of said Step (2) are stated as follows:
   (2-1) establishing a kd-tree for N point cloud data, and use such kd-tree to search each point Pi in the point cloud data;
   (2-2) for each point Pi, using K-NN to search its K nearest point cloud data, and calculating the Euclidean distance Lij between point cloud data Pi and the K nearest point cloud data.

3. The distance statistics based method for 3D sonar point cloud image enhancement according to claim 2, characterized in that specific procedures of the Step (3) are stated as follows:
  (3-1) calculating mean value $L_i$ of K Euclidean distance $L_{ij}$ for point $P_i$;
  (3-2) calculating mean value $\mu$ and standard deviation $\sigma$ for N elements in $L_i$;
  (3-3) estimating with mean value of $\mu$ and standard deviation of $\sigma$ for all $L_i$; selecting point cloud data whose value of corresponding $L_i$ element is outside of a--b as outlier; remove the outlier to complete enhancement of 3D sonar point cloud image; wherein, $a=\mu-\alpha\times\sigma$ and $b=\mu+\alpha\times\alpha$; $\alpha$ is a real number, referring as expansion coefficient.

4. A distance statistics based method for 3D sonar point cloud image enhancement, comprising the following steps:
  (1') obtaining sonar data, and convert 3D sonar range image information corresponding to sonar data per frame into point cloud data in global coordinate;
  (2') using a kd-tree to search the point cloud data, and calculate Euclidean distance Lij between point Pi and all other point cloud data within its neighborhood in distance r; wherein, value range of i and j is $1 \leq i \leq N$ and $1 \leq j \leq Mi$ respectively;
  N refers to total quantity of the point cloud data;
  Mi refers to quantity of the point cloud data within neighborhood in distance r of point cloud data Pi;
  (3') excluding point cloud data corresponding to mean value of Lij which do not match certain Gaussian distribution, and complete enhancement of 3D sonar point cloud image.

5. The distance statistics based method for 3D sonar point cloud image enhancement according to claim 4, characterized in that specific procedures of said Step (2') are stated as follows:
  (2-1') establishing a kd-tree for N point cloud data, and use such kd-tree to search each point Pi in the point cloud data;
  (2-2') for each point Pi, searching all point cloud data within neighborhood in distance r, and calculating the Euclidean distance Lij between point cloud data Pi and all point cloud data within its neighborhood in distance r.

6. The distance statistics based method for 3D sonar point cloud image enhancement according to claim 4, characterized in that specific procedures of the Step (3') are stated as follows:
  (3-1') calculating mean value $L_i'$ of $M_i$ Euclidean distance $L_{ij}$ for point cloud data $P_i$;
  (3-2') calculating mean value $\mu'$ and standard deviation $\sigma'$ for N elements in $L_i$;
  (3-3') for all $L_i'$, calculating means value of $\mu'$ and standard deviation of $\sigma'$ for Gaussian distribution statistics; selecting point cloud data whose value of corresponding $L_i$ element is outside of a'--b' as outlier; remove the outlier to complete enhancement of 3D sonar point cloud image; wherein, $a'=\mu'-\alpha\times\sigma'$ and $b'=\mu'+\alpha\times\sigma'$; $\alpha$ is a real number, referring as expansion coefficient.

* * * * *